(12) United States Patent
Haussmann

(10) Patent No.: US 11,817,568 B2
(45) Date of Patent: Nov. 14, 2023

(54) TEMPERATURE-CONTROL ELEMENT FOR CONTROLLING THE TEMPERATURE OF AN ELECTRICAL ENERGY ACCUMULATOR

(71) Applicant: WEBASTO SE, Stockdorf (DE)

(72) Inventor: Jochen Haussmann, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 399 days.

(21) Appl. No.: 17/253,105

(22) PCT Filed: Jul. 1, 2019

(86) PCT No.: PCT/EP2019/067541
§ 371 (c)(1),
(2) Date: Dec. 16, 2020

(87) PCT Pub. No.: WO2020/002699
PCT Pub. Date: Jan. 2, 2020

(65) Prior Publication Data
US 2021/0265680 A1  Aug. 26, 2021

(30) Foreign Application Priority Data

Jun. 29, 2018 (DE) .................... 10 2018 115 791.6

(51) Int. Cl.
*H01M 10/6556* (2014.01)
*H01M 50/50* (2021.01)
*H01M 50/569* (2021.01)

(52) U.S. Cl.
CPC ....... *H01M 10/6556* (2015.04); *H01M 50/50* (2021.01); *H01M 50/569* (2021.01)

(58) Field of Classification Search
CPC ................................................ H01M 10/6556
See application file for complete search history.

(56) References Cited

U.S. PATENT DOCUMENTS

| | | | | |
|---|---|---|---|---|
| 4,729,428 A | * | 3/1988 | Yasutake | F28F 13/12 165/166 |
| 2001/0003304 A1 | * | 6/2001 | Azar | F28F 13/06 174/16.3 |
| 2015/0325894 A1 | * | 11/2015 | Merriman | H01M 10/655 429/120 |

FOREIGN PATENT DOCUMENTS

| | | |
|---|---|---|
| DE | 3521914 A1 | 1/1986 |
| DE | 3731669 A1 | 4/1989 |
| DE | 9406559 U1 | 7/1994 |
| DE | 20205200 U1 | 8/2002 |
| DE | 10 2008 031 158 A1 | 1/2010 |

(Continued)

OTHER PUBLICATIONS

Office Action dated Dec. 2, 2021 from corresponding German application No. 10 2018 115 791.6, 5 pages.

(Continued)

*Primary Examiner* — Scott J. Chmielecki
(74) *Attorney, Agent, or Firm* — Haynes and Boone, LLP

(57) ABSTRACT

A temperature-control element for controlling the temperature of an electrical accumulator, in particular for controlling the temperature of a traction battery of a vehicle, includes an extruded profile extending in an extrusion direction which has a temperature-control medium channel for passage of a temperature-control medium. A guide vane is integrally formed with the extruded profile in the temperature-control medium channel.

13 Claims, 1 Drawing Sheet

(56) References Cited

FOREIGN PATENT DOCUMENTS

DE     10 2014 001 975 A1     8/2015
DE     10 2015 214 661 A1     2/2017

OTHER PUBLICATIONS

International Search Report and Written Opinion for International Patent Application No. PCT/EP2019/067541 dated Jan. 2, 2020, 12 pages.

* cited by examiner

TEMPERATURE-CONTROL ELEMENT FOR CONTROLLING THE TEMPERATURE OF AN ELECTRICAL ENERGY ACCUMULATOR

CROSS REFERENCE TO RELATED APPLICATIONS

This application is a national stage of International Application No. PCT/EP2019/067541, filed Jul. 1, 2019, which claims priority from German Patent Application No. 10 2018 115 791.6 filed on Jun. 29, 2018 in the German Patent and Trademark Office, the disclosures of which are incorporated herein by reference in their entirety.

BACKGROUND

Technical Field

The present invention relates to a temperature-control element for controlling the temperature of an electrical accumulator, in particular for controlling the temperature of a traction battery of a vehicle, for example in a private vehicle, a truck or other commercial vehicles.

Related Art

Temperature-control elements for controlling the temperature of electrical accumulators in motor vehicles, in particular for controlling the temperature of vehicle traction batteries, are known which have a temperature-control medium channel through which a temperature-control medium can flow in a direction of flow. It is possible by means of the temperature-control medium to adjust the temperature-control element to a temperature predetermined by the temperature-control medium or to maintain it in the vicinity of said temperature predetermined by the temperature-control medium. Heat may thus be supplied to or dissipated from the electrical accumulator in order to heat or cool the electrical accumulator as appropriate.

Electrical accumulators for vehicles and in particular traction batteries have a preferred temperature range or temperature window in which it is possible to operate them efficiently or even at all. Accordingly, it may for example be necessary in winter to preheat a traction battery before it is actually operated in order for it to be possible for the desired power to be drawn. During high levels of power demand, for example during charging or discharging, or at high ambient temperature, in contrast, it may be necessary to cool a traction battery in order to avoid overheating and thus inefficient operation of or damage to the traction battery.

DE 10 2014 001 975 A1, for example, discloses a temperature-control element for controlling the temperature of a vehicle battery which defines a cavity formed along a direction of flow for guiding a temperature-control medium and can be produced by extrusion.

SUMMARY

A temperature-control element for controlling the temperature of an electrical accumulator which enables maximally efficient temperature control of a battery system is described herein according to various embodiments.

A temperature-control element for controlling the temperature of an electrical accumulator, in particular for controlling the temperature of a traction battery of a vehicle, is accordingly proposed which includes an extruded profile extending in an extrusion direction which has a temperature-control medium channel for passage of a temperature-control medium. A guide vane integrally formed with the extruded profile is provided in the temperature-control medium channel.

Because a guide vane integrally formed with the extruded profile is provided in the temperature-control medium channel, it is possible to achieve particularly efficient and simple temperature control of the electrical accumulator since the guide vane causes swirling of the temperature-control medium flowing through the temperature-control medium channel, so achieving maximally uniform absorption or dissipation of heat which makes the best possible use of the heat transfer capacity of the temperature-control medium over the temperature-control element.

The direction of flow of the temperature-control medium substantially corresponds to the longitudinal extent of the extruded profile and thus also to the extrusion direction E of the extruded profile.

Because the guide vane is integrally formed with the extruded profile which forms the temperature-control medium channel, it is furthermore possible to ensure that incorrect fitting of separate guide vanes during assembly or other processing steps, or slippage, displacement or detachment of the guide vanes during operation of the temperature-control element can be avoided. It may thus be ensured that the temperature distribution for which the particular temperature-control element was originally designed can actually be achieved.

It is thus also possible to reduce the geometric variance and potential errors during construction and fitting of the temperature-control element and so enhance the overall quality of the temperature-control element.

In particular, thanks to the guide vane being in an integrally formed arrangement with the extruded profile, it is in particular possible to ensure that fitters or assembly workers do not incorrectly fit or misposition guide vanes during assembly and so impair the temperature behavior of a temperature-control element for controlling the temperature of an electrical accumulator.

It should be borne in mind in this connection that electrical accumulators in particular are highly sensitive to a non-uniform or unintended or incorrect temperature distribution of a temperature-control element. This is in particular the case because those battery cells unintentionally provided with lower temperature-control performance may be subject to faster aging than comparable battery cells which have actually been provided with the intended temperature-control performance. Accordingly, excessively low uniformity of the temperature-control performance of a temperature-control element for controlling the temperature of an electrical accumulator entails the risk that a battery which has its temperature controlled non-uniformly in this manner will have an overall shorter service life than would be the case with more uniform temperature control.

The guide vane may have a dimension which extends transversely of the extrusion direction in order consequently to achieve particularly strong swirling or disturbance of the temperature-control medium flow.

Direct integration of the guide vanes into the extruded profile and thus also into the temperature-control medium channel results in a robust, reliable and maintenance-free temperature-control element in which the swirl elements are integrally formed with the temperature-control element.

Viewed along the direction of flow, the guide vanes generally protrude into the temperature-control medium channel with regard to a dimension lying perpendicular to the direction of flow. The temperature-control medium in the temperature-control medium channel is accordingly particularly efficiently swirled by incorporation of a disturbance which extends perpendicularly to the intended direction of flow.

A plane arranged through the guide vane may form an angle, in particular an angle of between 10° and 170°, with the extrusion direction. A particularly flexible configuration of the guide vane may be achieved in this manner, by means of which the temperature-control element is adapted to the particular predetermined or desired temperature distribution.

A rib extending in the extrusion direction and integrally formed with the extruded profile is typically arranged in the temperature-control medium channel and the guide vane is integrally formed with the rib. The guide vane may thus be formed at a desired location in the temperature-control medium channel.

The guide vane is generally here defined by a first cut in the rib extending substantially perpendicularly to the extrusion direction and by a second cut in the rib extending substantially in the extrusion direction and the guide vane is integrally connected to the rib along a bending edge. The guide vanes may accordingly be particularly simply and efficiently produced in the extruded profile, such that the guide vanes are provided at a determined position in the extruded profile and reliability thus ensured during assembly.

The guide vanes may also be formed by providing two second cuts in the rib which extend in the extrusion direction and define opposite sides of the guide vane. A window-like configuration of the guide vane may thus be achieved which is in particular advantageous in the case of a relatively tall rib configuration or in the case of a rib configuration which spans the temperature-control medium channel.

A plane arranged through the guide vane may form an angle, in particular an angle of between 10° and 170°, with the plane arranged through the rib. A particularly flexible configuration of the guide vane may be achieved in this manner, by means of which the temperature-control element is adapted to the particular predetermined or desired temperature distribution.

Uniform swirling may be achieved by providing at least two guide vanes which form planes which are oriented parallel to one another.

A plurality of guide vanes may also be integrally formed with the extruded profile in the temperature-control medium channel in order to form in this manner a suitable ribbed structure in the temperature-control medium channel Because of the guide vanes being integrally formed with the extruded profile, it is possible to achieve a positionally stable configuration and thus also functional stability over the long term.

As a result of implementing the guide vanes directly in the semi-finished product or extruded profile which forms part of the temperature-control element, additional components need not be introduced or assembled nor need any effort be made to fix them in place. The temperature-control element may thus be produced in an overall more efficient and less costly manner.

The position and geometry of the guide vane can be simply adapted to the particular desired configuration by forming different areas and different angular positions which may accordingly be of significance to the desired swirling of the temperature-control medium and may provide the corresponding functionality.

The temperature-control medium channel is in various embodiments integrally formed. In other words, the extruded profile is a closed profile which completely encloses the temperature-control medium channel at least in the extrusion direction and thus also in the direction of flow. Only at the end faces is the extruded profile open and only via the end faces is access provided to the temperature-control medium channel.

A method for providing a temperature-control element for controlling the temperature of an electrical accumulator, in particular for controlling the temperature of a traction battery of a vehicle, wherein an extruded profile extending in the extrusion direction which has a temperature-control medium channel for passage of a temperature-control medium is described according to various embodiments. A guide vane is integrally formed with the extruded profile in the temperature-control medium channel.

A rib integrally formed with the extruded profile and extending in the extrusion direction may be arranged in the temperature-control medium channel and the guide vane may be defined by a first cut in the rib extending substantially perpendicularly to the extrusion direction and a second cut in the rib extending substantially in the extrusion direction and be bent along a bending edge out from the plane formed by the rib into the temperature-control medium channel.

BRIEF DESCRIPTION OF THE FIGURES

Further embodiments of the invention are explained in greater detail by the following description of the figures.

DETAILED DESCRIPTION

Exemplary embodiments are described below with reference to the figures. Identical, similar or equivalently acting elements in the various figures are provided with identical reference signs and these elements are sometimes not repeatedly described in order to avoid redundancy.

Figure 1:
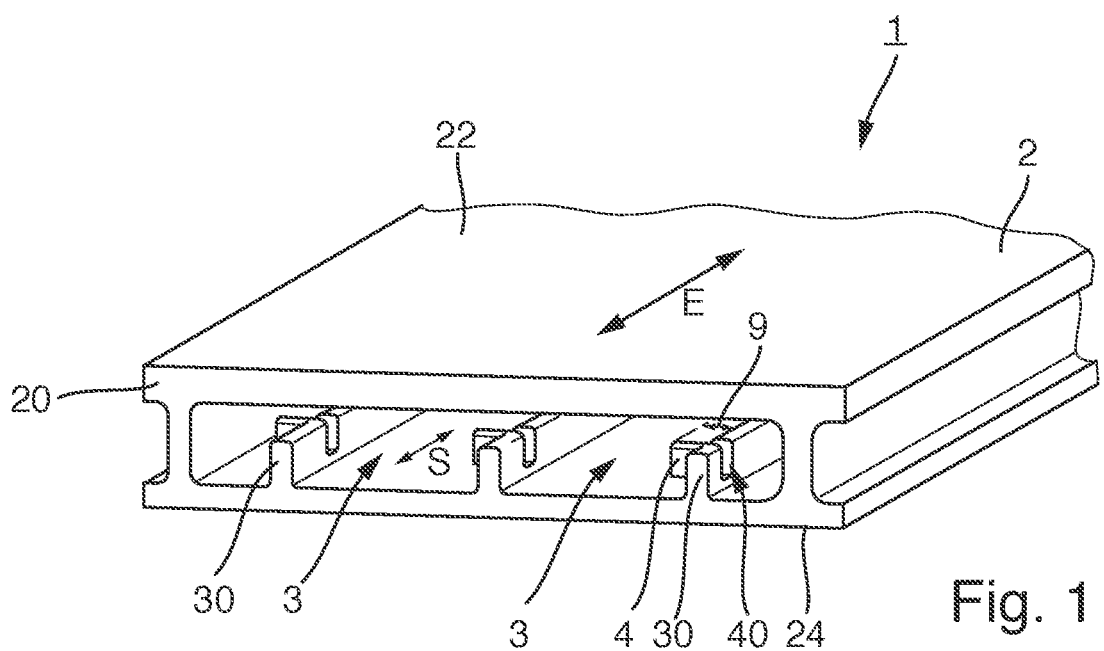
FIG. 1 is a schematic, perspective representation of a temperature-control element for controlling the temperature of an electrical accumulator.

FIG. 1 shows a perspective and schematic representation of a temperature-control element 1 for controlling the temperature of an electrical accumulator, for example for controlling the temperature of a traction battery for a motor vehicle.

The temperature-control element 1 includes an extruded profile 2 which includes inter alia a top 22 and a bottom 24. The extruded profile 2 extends in an extrusion direction, denoted by the arrow E in FIG. 1, and may take the form of a semi-finished product which may ultimately be provided together with further components to make up a temperature-control element 1, for example with connection plates, not shown in the figures, for providing a feed for a temperature-control medium on one of the end faces 20 of the extruded profile 2.

An electrical accumulator, not shown in the figures, may for example be arranged on the top 22 or on the bottom 24 of the extruded profile 2 of the temperature-control element 1 in order in this manner to achieve heat exchange between the temperature-control element 1, in particular the extruded profile 2, and the electrical accumulator. The temperature-control element 1 and thus the extruded profile 2 may also be arranged between battery modules of an electrical accumulator, such that, in order to control the temperature of the electrical accumulator, it is, for example, also possible to provide a battery module on both the top 22 and the bottom 24 of the extruded profile 2.

A traction battery may, for example, be in thermally conductive contact with the top 22 or with the bottom 24 of the extruded profile 2 of the temperature-control element 1 in order in this manner to control the temperature of the traction battery. Individual battery modules of the traction battery may here also be in thermally conductive contact with the extruded profile 2.

A temperature-control medium channel 3, which is defined by the extruded profile 2, is provided in the extruded profile 2. Along the extrusion direction E, the extruded profile 2 accordingly forms a completely closed perimeter around the temperature-control medium channel 3, such that access to the temperature-control medium channel 3 is provided only at the end faces 20 of the extruded profile 2.

The extruded profile 2 extends along the extrusion direction E in such a manner that the temperature-control medium channel 3 accordingly also defines a direction of flow S for a temperature-control medium passing through the temperature-control element 2 in the temperature-control medium channel 3. The extrusion direction E thus accordingly also defines a direction of flow S for a temperature-control medium, along which a temperature-control medium may pass through the temperature-control medium channel 3. The temperature-control medium may for example be a heated or cooled fluid by means of which heat transfer may be achieved in the extruded profile 2.

By means of the temperature-control medium, the temperature of the temperature-control element 1 including the extruded profile 2 and thus also the temperature of an electrical accumulator in thermally conductive contact with the extruded profile 2 may be controlled so as to cool or heat the electrical accumulator.

In the exemplary embodiment shown, the extruded profile 2 has ribs 30 located in the temperature-control medium channel 3 which are integrally formed with the extruded profile 2 and were accordingly extruded together with the extruded profile.

The ribs 30 shown in the exemplary embodiment shown in FIG. 1 do not extend over the full height of the temperature-control medium channel 3, but instead extend only over a sub-region thereof, in the exemplary embodiment shown for example to approximately half the height of the temperature-control medium channel 3.

In a further exemplary embodiment, not shown here, the ribs 30 may also extend over a lesser or greater height or also completely span the interspace between the top 22 and the bottom 24 of the extruded profile 2.

The ribs 30 may be provided for mechanically bracing the extruded profile 2.

The ribs 30 may also serve to guide the temperature-control medium within the temperature-control medium channel 3.

The ribs 30 may furthermore also bring about swirling of the temperature-control medium and may accordingly serve to ensure a more uniform distribution of the temperature-control medium within the temperature-control medium channel 3. In this manner, it is also possible to achieve more uniform heat exchange between the temperature-control medium and the various spatial portions of the extruded profile 2.

In order to achieve a still more uniform distribution of the temperature-control medium in the temperature-control medium channel 3, guide vanes 4 are integrally formed with the extruded profile 2. The guide vanes 4 in each case have a dimension 9 which extends transversely of the extrusion direction E into the temperature-control medium channel 3.

The guide vanes 4 thus also have a dimension 9 extending transversely of the direction of flow S of the temperature-control medium which accordingly introduces a disturbance into the temperature-control medium flow, resulting in circulation or swirling of the temperature-control medium in the temperature-control medium channel 3 and leading to still more uniform heat exchange between the top 22 and the bottom 24 of the temperature-control element 1.

Figure 2:
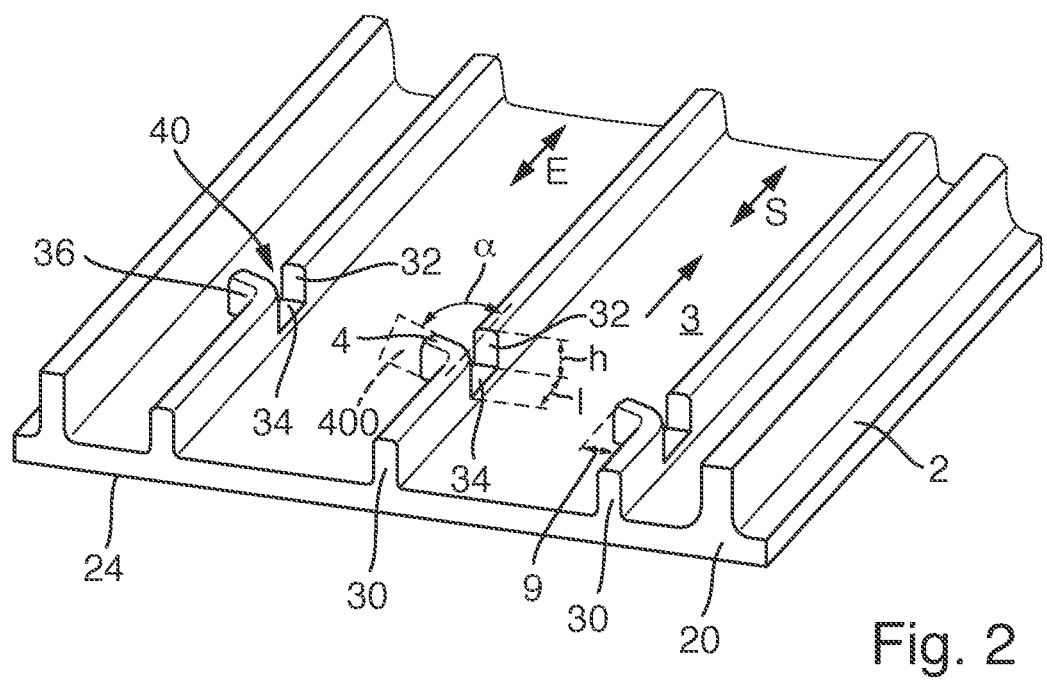
FIG. 2 is a schematic, partially sectional perspective plan view of the temperature-control element of FIG. 1, wherein the upper half of the extruded profile has been removed.

FIG. 2 shows the temperature-control element 1 from FIG. 1 but with the top 22 of the extruded profile 2 removed for clarity. It is particularly clearly apparent here that the guide vanes 4 are formed by there being in the ribs 30 in each case a first cut 32 introduced in the direction of the height extent of the rib 30, i.e. perpendicularly to the extrusion direction E, and a second cut 34 in the longitudinal direction of the rib 30, i.e. also in the extrusion direction E, and then the portion of the material of the rib 30 rendered mobile in this manner being bent out of the plane defined by the rib 30. A bending edge 36 where the guide vane 4 is integrally connected to the rib 30 is accordingly obtained at the edge of the guide vane 4 which remains attached to the rib 30.

In a further exemplary embodiment, two second cuts 34 may also be provided which then define two opposite sides of the guide vane 4. This configuration is in particular of significance in those cases in which the rib 30 is taller or even extends from the top 22 to the bottom 24. In this case, the guide vane 4 is bent out from the rib in a similar manner to a window.

The dimensions of the guide vanes 4 are therefore substantially determined by the height h of the first cut 32 in the rib 30 and the length l of the second cut 34 along the longitudinal extent of the rib 30. If the length l of the second cut 34 is extended, then the dimension 9 extending transversely of the direction of flow S of the guide vane 4 may also be increased, such that the guide vane 4 then accordingly reaches further or deeper into the temperature-control medium channel 3 and the disturbance produced by the guide vane 4 is more pronounced.

The first cut 32 and the second cut 34 and the bending angle by which the respective guide vane 4 is bent out from the plane defined by the rib 30 may be differently dimensioned for each application.

In particular, it is not necessary for the purposes of forming the dimension 9 extending transversely of the extrusion direction E of the guide vane 4 for a plane 400 formed by the guide vane 4 to form an angle α of precisely 90° with the plane formed by the rib 30. Instead, different angles α between the plane 400 of the guide vane 4 and the plane of the rib 30, for example angles α of between 10° and 170°, are possible depending on the desired application or effect.

As a result of the form imparted to the guide vane 4 in this manner, material is removed from the plane of the rib 30 and bent into the temperature-control medium channel 3. An opening 40 in the rib 30 is thus obtained in the region of the rib 30 from which the guide vane 4 is bent out, which opening can result in an exchange of temperature-control medium between the two sides of the rib 30, such that further intermixing of temperature-control medium may proceed in this manner, so further increasing the uniformity of heat exchange.

Insofar as applicable, all individual features which are depicted in the exemplary embodiments may be combined and/or interchanged with one another without going beyond the scope of the invention.

The invention claimed is:

1. A temperature-control element for controlling the temperature of an electrical accumulator, comprising:
   an extruded profile extending in an extrusion direction comprising:
      a temperature-control medium channel configured to allow a temperature-control medium to flow therethrough,
      a guide vane integrally formed with the extruded profile in the temperature-control medium channel, and
      a rib extending in the extrusion direction and integrally formed with the extruded profile, wherein:
   the temperature-control medium channel is integrally formed in such a way that the extruded profile forms a closed profile that completely encloses the temperature-control medium channel at least in the extrusion direction,
   the rib is arranged in the temperature-control medium channel and the guide vane is integrally formed with the rib,
   the guide vane is defined by a first cut in the rib extending substantially perpendicularly to the extrusion direction and a second cut in the rib extending substantially in the extrusion direction, and
   the guide vane is integrally connected to the rib along a bending edge.

2. The temperature-control element of claim 1, wherein the guide vane comprises a dimension extending transversely of the extrusion direction.

3. The temperature-control element of claim 1, wherein a plane formed by the guide vane forms an angle with the extrusion direction.

4. The temperature-control element of claim 3, wherein the angle is between 10° and 170°.

5. The temperature-control element of claim 1, further comprising a third cut in the rib extending in the extrusion direction, wherein the second cut and the third cut define opposite sides of the guide vane.

6. The temperature-control element of claim 1, wherein a plane that is formed by the guide vane forms an angle with a plane that is formed by the rib.

7. The temperature-control element of claim 6, wherein the angle is between 10° and 170°.

8. The temperature-control element of claim 1, wherein the rib has an opening.

9. The temperature-control element of claim 1, wherein the guide vane comprises at least two guide vanes, and the at least two guide vanes have planes oriented parallel to one another.

10. The temperature-control element of claim 1, wherein the guide vane comprises a plurality of guide vanes integrally formed with the extruded profile to provide a ribbed structure.

11. A method for controlling the temperature of an electrical accumulator, comprising:
   providing a temperature-control element for controlling the temperature of an electrical accumulator, comprising:
      an extruded profile extending in an extrusion direction comprising:
         a temperature-control medium channel configured to allow a temperature-control medium to flow therethrough,
         a guide vane integrally formed with the extruded profile in the temperature-control medium channel, and
         a rib extending in the extrusion direction and integrally formed with the extruded profile, wherein:
      the temperature-control medium channel is integrally formed in such a way that the extruded profile forms a closed profile that completely encloses the temperature-control medium channel at least in the extrusion direction,
      the rib is arranged in the temperature-control medium channel and the guide vane is integrally formed with the rib,
      the guide vane is defined by a first cut in the rib extending substantially perpendicularly to the extrusion direction and a second cut in the rib extending substantially in the extrusion direction, and
      the guide vane is integrally connected to the rib along a bending edge; and
   arranging the electrical accumulator or a battery module of the electrical accumulator on a top or a bottom portion of the extruded profile.

12. The method of claim 11, wherein the guide vane is bent along a bending edge out from a plane formed by the rib into the temperature-control medium channel.

13. The method of claim 11, further comprising providing first and second battery modules of the electrical accumulator, wherein the first battery module is arranged on the top portion of the extruded profile and the second battery module is arranged on the bottom portion of the extruded profile.

* * * * *